(12) United States Patent
Hanschke et al.

(10) Patent No.: US 10,660,158 B2
(45) Date of Patent: May 19, 2020

(54) HEATED FLOOR PANEL FOR AN AIRCRAFT AND AIRCRAFT HAVING A HEATED FLOOR PANEL

(71) Applicant: Airbus Operations GmbH, Hamburg (DE)

(72) Inventors: Christian Hanschke, Achim (DE); Sebastian Scheffler, Hamburg (DE); Wolfgang Fiss, Adendorf (DE)

(73) Assignee: Airbus Operations GmbH (DE)

( * ) Notice: Subject to any disclaimer, the term of this patent is extended or adjusted under 35 U.S.C. 154(b) by 167 days.

(21) Appl. No.: 14/571,988

(22) Filed: Dec. 16, 2014

(65) Prior Publication Data

US 2015/0136751 A1 May 21, 2015

Related U.S. Application Data

(63) Continuation of application No. PCT/EP2013/063227, filed on Jun. 25, 2013.

(Continued)

(30) Foreign Application Priority Data

Jun. 29, 2012 (EP) .................................... 12174345

(51) Int. Cl.
*H05B 1/02* (2006.01)
*B64C 1/18* (2006.01)
(Continued)

(52) U.S. Cl.
CPC ............. *H05B 1/0236* (2013.01); *B64C 1/18* (2013.01); *B64D 13/00* (2013.01); *F24D 13/024* (2013.01);
(Continued)

(58) Field of Classification Search
CPC ................ H05B 1/0236; H05B 1/0275; H05B 2203/026; H05B 3/22–32; F24D 13/024;
(Continued)

(56) References Cited

U.S. PATENT DOCUMENTS 4,581,522 A * 4/1986 Graham .............. F24D 19/1096
219/213
4,620,085 A * 10/1986 Horikawa ............. F24D 13/022
174/51
(Continued)

FOREIGN PATENT DOCUMENTS

EP  1 854 719 A2  11/2007
JP  60162130 A * 8/1985 ........... F24D 13/022

OTHER PUBLICATIONS

Translation of JP-60162130-A.*
International Search Report dated Jul. 19, 2013 PCT/EP2013/063227.

*Primary Examiner* — Tu B Hoang
*Assistant Examiner* — Erin E McGrath
(74) *Attorney, Agent, or Firm* — Lerner, David, Littenberg, Krumholz & Mentlik, LLP

(57) ABSTRACT

A heated floor panel for an airborne vehicle and an airborne vehicle having at least one heated floor panel are described. The floor panel includes a controller housing, a first heated panel configured to heat the floor panel, a panel connector arranged in a wall of the controller housing, at least one power line coupled between the panel connector and the first heated panel and configured to supply electric power, which is input to the panel connector, to the first heated panel, a switch connected in one of the power lines, and a microcontroller connected to the switch and configured to actuate the switch for interrupting the electric power supply to the first heated panel in case of an electric fault in the floor panel.

13 Claims, 3 Drawing Sheets

Related U.S. Application Data

(60) Provisional application No. 61/665,924, filed on Jun. 29, 2012.

(51) Int. Cl.
*F24D 13/02* (2006.01)
*B64D 13/00* (2006.01)
*F24D 19/10* (2006.01)

(52) U.S. Cl.
CPC ....... F24D 19/1084 (2013.01); H05B 1/0275 (2013.01); *H05B 2203/026* (2013.01); *Y02B 30/26* (2013.01)

(58) Field of Classification Search
CPC ........ F24D 13/00; F24D 13/02; F24D 13/022; F24D 13/026; F24D 13/028; B64C 1/18
USPC ....... 219/202, 482, 483, 507, 520, 522, 536, 219/537, 541
See application file for complete search history.

(56) References Cited

U.S. PATENT DOCUMENTS

| | | | |
|---|---|---|---|
| 4,633,061 A * | 12/1986 | Arikawa | A47C 7/748 219/202 |
| 6,611,659 B2 | 8/2003 | Meisiek | |
| 7,104,462 B2 | 9/2006 | Shearer | |
| 2003/0065472 A1* | 4/2003 | Eckel | H05B 37/02 702/130 |
| 2005/0150968 A1 | 7/2005 | Shearer | |
| 2007/0053188 A1* | 3/2007 | New | A61L 9/20 362/276 |
| 2007/0158501 A1 | 7/2007 | Shearer et al. | |
| 2007/0262074 A1* | 11/2007 | Shearer | B64D 13/00 219/532 |
| 2008/0083720 A1* | 4/2008 | Gentile | A43B 3/0005 219/211 |
| 2011/0149447 A1 | 6/2011 | Fink et al. | |

* cited by examiner

HEATED FLOOR PANEL FOR AN AIRCRAFT AND AIRCRAFT HAVING A HEATED FLOOR PANEL

CROSS-REFERENCE TO RELATED APPLICATIONS

The present invention is a continuation of International Application No. PCT/EP2013/063227 filed Jun. 25, 2013, which claims priority from EP 12174345.4 filed Jun. 29, 2012, and which claims the benefit of the filing date of U.S. Provisional Patent Application No. 61/665,924 filed Jun. 29, 2012, all of which are incorporated herein by reference.

TECHNICAL FIELD OF THE INVENTION

The present invention pertains to a heated floor panel, particularly in the floor near the exit or entrance of an aircraft. Moreover, the invention pertains to an aircraft having a heated floor panel, in particular in the floor near the exit or entrance.

BACKGROUND OF THE INVENTION

In the exit areas of aircraft heated floor panels may be employed. The floor panels are equipped with a heating system internal to the floor panel which is able to heat up the floor near the exit of the aircraft. This may done on the one hand to improve the comfort level of the passengers and the cabin crew, on the other hand to compensate for the usually low temperatures on the outside of the aircraft that may occur especially during long-haul flights.

The document U.S. Pat. No. 6,611,659 B2 discloses a heated floor panel for an aircraft that comprises a heater, a temperature sensor and an overheating protection switch to keep the floor panel from overheating.

The document US 2011/0149447 A1 discloses a heatable floor panel having a ground fault interrupting circuit installed therein.

The document EP 1 854 719 A2 discloses a heated floor panel for an aircraft having a heated panel, a controller strapped to the outside of the housing of the floor panel and a ground fault circuit interrupting the current delivered to the heated panel in case of a ground fault.

The document U.S. Pat. No. 7,104,462 B2 discloses a solid state thermostat including a thermostat input operatively configured to be coupled to a temperature sensor, a comparator for comparing an output of the temperature sensor to a predefined setpoint temperature, and solid-state switching circuitry operatively coupled to the comparator for selectively switching current to a thermostat output based on the comparison by the comparator.

BRIEF SUMMARY OF THE INVENTION

An aspect of the present invention may provide an improved heated floor panel which is easy to maintain and repair, easy to install, reliable in terms of electric fault detection and flexible in linking to existing floor heating systems of an airborne vehicle, such as an aircraft.

According to an aspect of the present invention, the floor panel comprises a heated floor panel for an airborne vehicle. The floor panel comprises a controller housing, a first heated panel configured to heat the floor panel, a panel connector arranged in a wall of the controller housing, at least one power line coupled between the panel connector and the heated panel and configured to supply electric power, which is input to the panel connector, to the first heated panel, a switch connected in one of the power lines, and a microcontroller connected to the switch and configured to actuate the switch for interrupting the electric power supply to the first heated panel in case of an electric fault in the floor panel.

According to another aspect of the present invention, an airborne vehicle comprises a floor heating system, the floor heating system comprising a floor panel according to the first aspect of the present invention, which is operatively connected to a cabin information data system of the airborne vehicle via a communication data bus.

One idea of the present invention is to provide for a heated floor panel for an airborne vehicle, which may be easily installed within the vehicle, which is easy to maintain and repair and which provides an integral housing for components, in particular for a microcontroller of the floor panel which may be arranged within the floor panel. That way, a separate housing structure for the microcontroller in the airborne vehicle or the structure of the vehicle may be dispensed with. With such a floor panel, the installation effort, installation space and installation costs may be significantly reduced.

According to an embodiment, the floor panel further comprises a second heated panel configured to heat the floor panel, wherein the microcontroller is configured to control a power supply to the first and the second heated panel. This provides the advantage of multiple heated panels being controllable by a single microcontroller in a master/slave relationship. This allows for a more flexible layout of the floor panel as well as easier industrialization, cost reduction and other advantages.

According to a further embodiment of the floor panel, the floor panel further comprises a temperature sensor arranged in the heated panel and coupled to the microcontroller. Advantageously, with such a temperature sensor it is possible to control the actual average temperature that the floor panel is heated up to.

According to yet another embodiment of the floor panel, the microcontroller is configured to store a configurable temperature setpoint value and to control the heated panel according to the temperature setpoint value and a temperature value determined from the temperature sensor. This provides the advantage that the temperature can be flexibly set via external access to the floor panel. In some embodiments, a value for the temperature setpoint may be adjusted externally and transmitted via a data bus to the microcontroller.

According to yet another embodiment of the floor panel, the controller housing is connected to the heated panel by means of an electrical connector, which is electrically engaged, when the controller housing is mechanically mounted to the heated panel. Advantageously, the electrical connector may be electrically engage without a specific need for visual control or feedback providing a secure and reliable electrical connection of the controller housing with the heated panel.

According to yet another embodiment of the floor panel, the floor panel further comprises a data line coupling the microcontroller to the panel connector configured to transfer controller data between the microcontroller and the panel connector. Advantageously, the data line being integrated into the panel connector reduces the number of connections between the floor panel and other components of an airborne vehicle. Moreover, the installation effort is significantly reduced. Additionally, the data line may be used for transferring the temperature setpoint value for controlling the temperature of the heated panel to the microcontroller.

According to yet another embodiment of the floor panel, the floor panel further comprises a communication device coupled to the microcontroller and configured to provide wireless communication to and from the microcontroller. With such a wireless communication, the number of electric lines needed to connect the floor panel to other components of the airborne vehicle and therefore the system weight of the airborne vehicle is advantageously reduced.

According to yet another embodiment of the floor panel, the switch comprises a solid state relay, in particular a MOSFET semiconductor switch. MOSFET switches are particularly advantageous since the MOSFET switch can be actuated at any point in time and not just only at zero current condition on the power lines. Thus, the floor panel is more effectively protected against electric faults.

According to yet another embodiment of the floor panel, the floor panel further comprises a ground fault detection unit coupled to the at least one power line and configured to detect a ground fault of the floor panel. According to another embodiment of the floor panel, the floor panel further comprises an arc fault detection unit coupled to the at least one power line and configured to detect an arc fault in the floor panel. In both cases, the floor panel is effectively protected against electric fault conditions. This leads to a better protection against electric hazards like fire, smoke, overheating or malfunction.

According to yet another embodiment of the floor panel, the microcontroller is further configured to monitor the current in the heated panel, and/or to monitor the functional state of the switch, and/or to monitor the temperature in the controller housing, and/or to monitor the functional state of the temperature sensor. With these measures, an effective self-diagnosis functionality of the floor panel may be implemented.

According to yet another embodiment of the floor panel, the microcontroller is further configured to store a protocol associated with electric faults detected by the ground fault detection unit and/or the arc fault detection unit in a non-volatile data storage. In order to reliably be able to track back error conditions the occurrence of electric faults may be stored until a maintenance and repair technician is able to assess and evaluate the severity and the nature of the fault.

According to yet another embodiment of the floor panel, the floor panel may further comprise a reset button configured to reset all or a subset of fault entries stored in the protocol in the non-volatile data storage.

According to yet another embodiment of the floor panel, all or a subset of fault entries stored in the non-volatile data storage may be resettable by external means using either the data line or the communication device.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Figure 1:
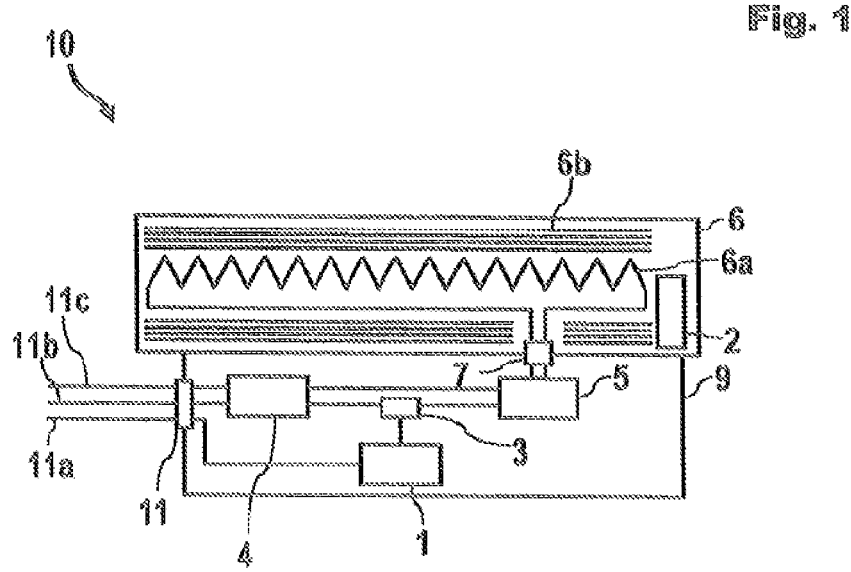
FIG. 1 shows a schematic cross-sectional view of a floor panel for an aircraft according to an embodiment of the invention.
Figure 4:
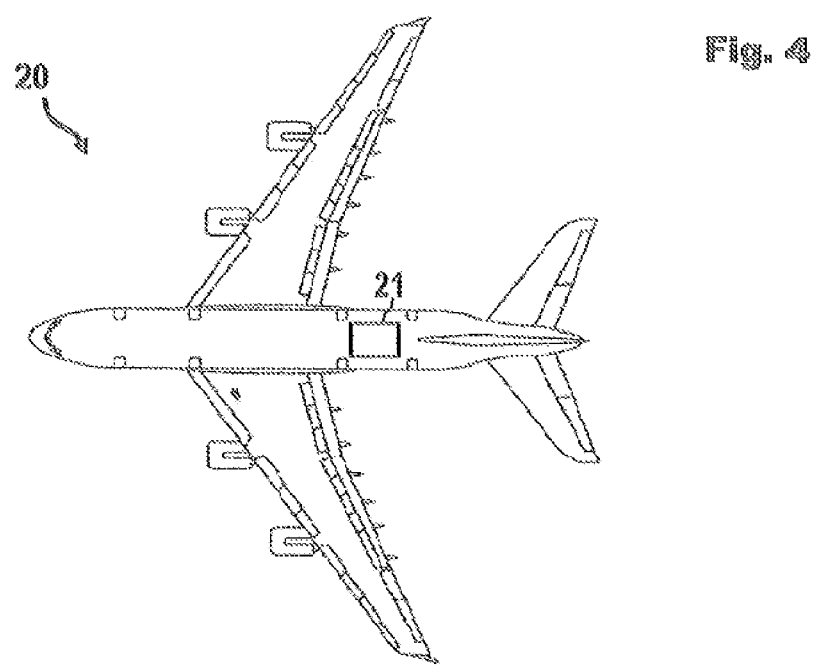
FIG. 4 shows an airborne vehicle including a floor heating system according to yet another embodiment of the invention.

FIG. 1 shows a floor panel 10, particularly a heated floor panel 10 for use in an airborne vehicle such as an aircraft. The floor panel 10 may be used in the floor near an exit or entrance area, for example a door of an airborne vehicle. FIG. 4 exemplarily shows such an airborne vehicle 20 having a floor heating system 21.

Returning to FIG. 1, the heated floor panel 10 may comprise a controller housing 9. The controller housing 9 may for example comprise a metallic material such as aluminum or a synthetic material.

The floor panel 10 may further comprise a heated panel 6 which is configured to heat the floor panel 10. The heated panel 6 may for example comprise an electric heating wire 6a or an electric heating foil 6a as a heater element, for example comprising Manganin®, which may be connected to power lines 11b, 11c which carry a supply current for the heating wire 6a. It may also be possible to use heating foils instead of or additionally to the heating wire 6a. The panel sheets 6b may provide heat spreading functionality as well as mechanical protection for the floor panel 10. The panel sheets 6b may for example comprise glassfibre structures, honeycomb structures, metallic surfaces or the like. The heated panel 6 provides first of all a mechanical function as it has to withstand the mechanical loads introduced to the heated panel 6 by the occupants of the aircraft and the aircraft itself. Proper selection of the panel sheets 6b may ensure this mechanical function besides the purpose of supporting the heat spreading.

The floor panel 10 may further comprise a panel connector 11 which may be arranged in a wall of the controller housing 9. The panel connector 11 may be configured to couple the floor panel 10 to a power supply system within the airborne vehicle 20. The panel connector 11 is adapted to facilitate the installation of the floor panel 10 in the airborne vehicle 20 by reducing the number of separate lines to be led through the airborne vehicle 20 and the respective connections to be made. The power supply may for example be a 115 VAC power supply.

The power lines 11a, 11b are coupled between the panel connector 11 and the heated panel 6 and configured to supply electric power, which is input to the panel connector 11, to the heated panel 6 via a plug-in unit. In at least one of the power lines a switch 3 is connected. The switch 3 may for example comprise a solid state relay, in particular a MOSFET semiconductor switch. The switch 3 may be actuated to interrupt the electric power supply to the heated panel 6.

The components 1, 3, 4 and 5 comprised in the controller housing 9 may constitute an integral subassembly within the housing. An electrical connector may be provided as heater connector 7 to electrically engage the controller housing 9 with respective electrical lines in the heated panel 6, or mounted on the heated panel 6.

The microcontroller 1 may be connected to the switch 3 in order to actuate the switch 3 for interrupting the electric power supply to the heated panel 6 in case of an electric fault in the floor panel 10. For detection of such electric faults, the floor panel 10 may for example comprise a ground fault detection unit 4 coupled to the at least one power line 11b, 11c which may be configured to detect a ground fault of the floor panel 10. For example, undesired leakage currents may occur between electrical components of the heated panel 6 and the aircraft structure to which the heated panel 6 may be fixed. Such leakage currents may be detected by the ground fault detection unit 4 as difference between the currents carried on the power lines 11b, 11c. A ground fault may be detected when the sum of the currents flowing in lines 11b and 11c is not zero, i.e. some current is flowing not on its dedicated path back to the electrical power supply.

Apart from supplying the heated panel 6 with power, the power lines 11b, 11c may also supply the electronic components in the controller housing 9, such as the microcontroller 1, with electric power.

Alternatively or additionally, the floor panel 10 may comprise an arc fault detection unit 5 coupled to the at least one power line 11b, 11c which may be configured to detect an arc fault in the floor panel 10. Both types of faults, ground faults and arc faults may endanger the safety of the floor panel 10, thus with the electric fault detections units 4 and/or 5 such electric faults may be detected early. Respective countermeasures may be implemented by the microcontroller 1. For example, in case of an electric fault, the power to the heated panel 6 may be shut down temporarily or continuously.

The microcontroller 1 may further be configured to store a protocol associated with electric faults detected by the ground fault detection unit 4 and/or the arc fault detection unit 5 in a non-volatile data storage. The data storage may be an internal memory of the microcontroller 1. The floor panel 10 may further comprise a reset functionality for the faults having been put into the protocol. For example, it may be possible to implement a reset button in the floor panel 10 by means of which a maintenance technician may be able to reset the data storage and remove older fault entries in the protocol. Alternatively, it may be possible to erase older entries in the protocol by means of an on-board maintenance system of the airborne vehicle 20.

The floor panel 10 may further comprise a temperature sensor 2 arranged in the heated panel 6. The temperature sensor 2 may be coupled to the microcontroller 1. The microcontroller 1 may be configured to store a configurable temperature setpoint value and to control the heated panel 6 according to the temperature setpoint value and a temperature value determined from the temperature sensor 2. A value for the temperature setpoint may be adjusted externally and transmitted via the data line 11a to the microcontroller 1.

In order to communicate with a floor heating system 21 of the airborne vehicle 20, the floor panel 10 may comprise a data line 11a coupling the microcontroller 1 to the panel connector 11 which may be configured to transfer controller data between the microcontroller 1 and the panel connector 11, and, hence, the floor heating system 21. The data line 11a may be integrated into the panel connector 11 so that only a single data bus for power supply and data connection is necessary to couple the floor panel 10 to the floor heating system 21 and the power supply of the airborne vehicle 20. The data line 11a may for example be adapted to be coupled to a CAN bus of the floor heating system 21.

The microcontroller 1 may further be configured to monitor the current in the heated panel 6, the functional state of the switch 3, the temperature in the controller housing 9, and the functional state of the temperature sensor 2.

It may be possible to provide for multiple plug-in units in the controller housing 9 in order to distribute electric power from a single controller housing 9 to one or more heated panels 6. In that case, the microcontroller 1 may act as a master device for multiple heated panels 6 acting as respective slave devices. The heated panels 6 may be connected to the controller housing 9 by means of an electric harness.

Figure 2:
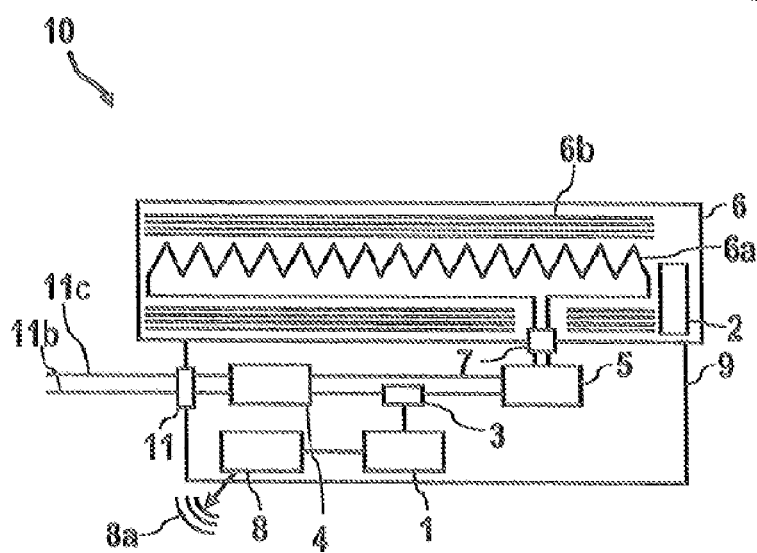
FIG. 2 shows a schematic cross-sectional view of a floor panel for an aircraft according to another embodiment of the invention.

In order to connect multiple heated panels 6 to a single controller housing 9 it may be possible to provide further electrical connectors in the controller housing 9 which are not explicitly shown in FIG. 1 or 2.

Figure 5:
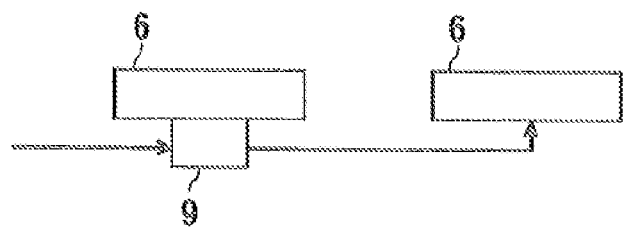
FIG. 5 shows an arrangement of heated floor panels in a master/slave architecture according to yet another embodiment of the invention.

FIG. 5 shows an example of such a master/slave architecture. Two heated panels 6 are connected to a single controller housing 9, whereas the leftmost heated panel 6 acts as the master panel and the rightmost heated panel 6 acts as a slave panel.

The microcontroller 1 may have additional control outputs for each of the slave devices. For example, the microcontroller 1 may control each heated panel 6 individually in parallel control loops. All control loops may use the same reference temperature setpoint. Alternatively, it may be possible to select a main heated panel 6 among the slave devices which is controlled in a single control loop by the microcontroller 1. In such a case, the remaining heated panels are electrically connected to the main heated panel in parallel so that the microcontroller 1 controls the temperature of the main heated panel and, in turn, the temperature of the remaining heated panels depending on the main heated panel.

FIG. 2 shows a schematic illustration of a floor panel 10 according to another embodiment. The floor panel 10 of FIG. 2 differs from the one depicted in FIG. 1 in that a communication device 8 is coupled to the microcontroller 1 and configured to provide wireless communication 8a to and from the microcontroller 1. With such a communication device 8 is it possible to dispense with the wire-bound data line 11a and couple to the floor panel to the floor heating system by means of a wireless connection 8a.

It may alternatively be possible to route controller data as power line communication (PLC) data over the power lines 11b, 11c.

Figure 3:
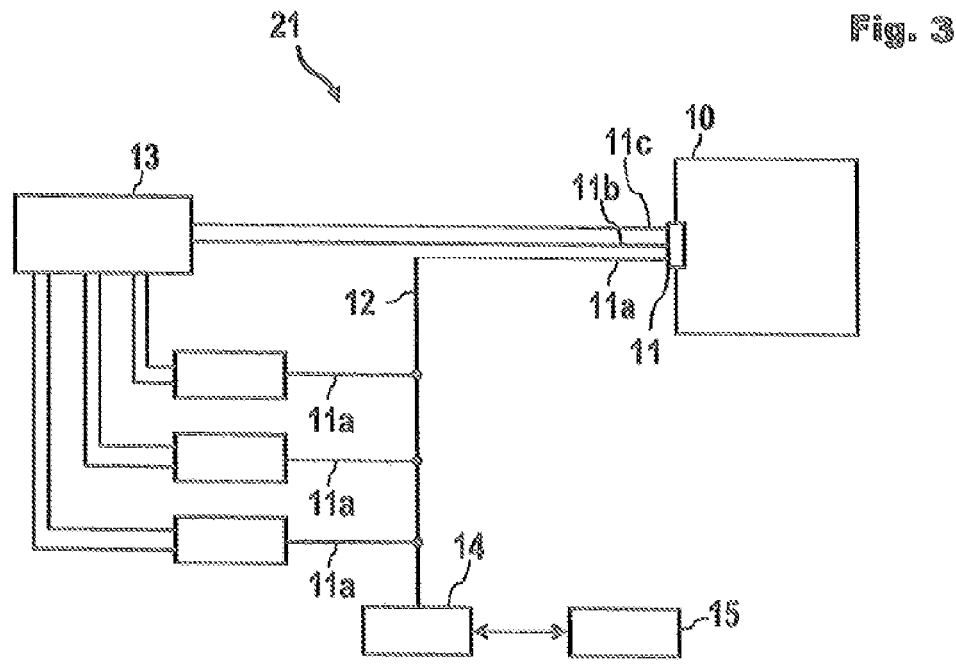
FIG. 3 shows a floor heating system of an aircraft including one or more heated floor panels according to yet another embodiment of the invention.

Both floor panels 10 of FIGS. 1 and 2 may be configured to be coupled to a floor heating system 21 of an airborne vehicle 20 as exemplarily schematically illustrated in FIG. 3. One or several of the floor panels 10 may be coupled via a common data bus 12 with respect to the data lines 11a. One or both of the power lines 11b, 11c may in each case be connected to a common power supply 13 of the airborne vehicle. It may be possible to provide electric ground by connecting one of the power lines 11b, 11c to the structure of the airborne vehicle 20. The floor heating system 21 may for example comprise a cabin information data system (CIDS) 14 which may be coupled to one or more flight attendant panels (FAP) 15 by means of which communication or controlling data may be gathered from or input to the microcontrollers 1 of the respective floor panels 10. For example, the setpoint of the temperature to be achieved by the floor panels 10 may be set via a FAP 15. The microcontroller 1 may provide the CIDS 14 via the data bus 12 with diagnosis, repair and/or maintenance information. The microcontroller 1 may contain a built-in test equipment (BITE) that may be controlled via the CIDS 14.

Using the floor panels 10 of FIG. 2, the floor panels 10 may in each case communicate with the CIDS 14 via a wireless communication link 8a as established by the communication device 8.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively.

The invention claimed is:

1. A floor panel for an airborne vehicle, the floor panel comprising:
    a controller housing having a first side-wall, a second side-wall, a top wall and a bottom wall;
    a first heated panel configured to heat the floor panel, the first heated panel comprising a top set of panel sheets, a bottom set of panel sheets separated from the top set of panel sheets in at least one region, and a heater element interposed between the top and bottom sets of panel sheets in the at least one region, the bottom set of panel sheets resting on the top wall of the controller housing;
    a panel connector arranged in the first side-wall of the controller housing;
    a heater connector for connecting the controller housing and the first heated panel and arranged in the top wall of the controller housing;
    at least one power line coupled between the panel connector and the heater connector in the controller housing and configured to supply electric power, which is input to the panel connector, to the first heated panel via the heater connector;
    a switch connected in the at least one power line between the panel connector and the heater connector; and
    a microcontroller arranged in the controller housing and connected to the switch and configured to actuate the switch for interrupting electric power supply to the first heated panel in case of an electric fault in the floor panel, a communication device coupled to the microcontroller and configured to provide wireless communication to and from the microcontroller,
    wherein the controller housing is connected to the first heated panel by the heater connector, the heater connector being electrically engaged when the controller housing is mechanically mounted to the first heated panel
    wherein a first end of the heater connector projects from the top wall into the first heated panel and a second end of the heater connector projects from the top wall into the controller housing,
    wherein the heater connector is configured as a plug-in unit, and
    wherein the heater connector electrically connects the first heated panel to the at least one power line.

2. The floor panel of claim 1, further comprising:
    a second heated panel configured to heat the floor panel, wherein the microcontroller is configured to control a power supply to the first and the second heated panel.

3. The floor panel of claim 1, further comprising:
    a temperature sensor arranged in the first heated panel and coupled to the microcontroller.

4. The floor panel of claim 3, wherein the microcontroller is configured to store a configurable temperature setpoint value and to control the first heated panel according to the temperature setpoint value and a temperature value determined from the temperature sensor.

5. The floor panel of claim 1, further comprising:
    a data line coupling the microcontroller to the panel connector configured to transfer controller data between the microcontroller and the panel connector.

6. The floor panel of claim 1, wherein the switch comprises a solid state relay.

7. The floor panel of claim 1, further comprising:
    a ground fault detection unit coupled to the at least one power line and configured to detect a ground fault of the floor panel.

8. The floor panel of claim 1, further comprising:
    an arc fault detection unit coupled to the at least one power line and configured to detect an arc fault in the floor panel.

9. The floor panel of claim 2, wherein the microcontroller is further configured to do at least one of the following:
    to monitor a current in the heated panel,
    to monitor a functional state of the switch,
    to monitor a temperature in the controller housing, or
    to monitor a functional state of the temperature sensor.

10. The floor panel of claim 7, wherein the microcontroller is further configured to store a protocol associated with electric faults detected by the ground fault detection unit or the arc fault detection unit in a non-volatile data storage.

11. The floor panel of claim 10, further comprising:
    a reset button configured to reset all or a subset of fault entries stored in the protocol in the non-volatile data storage.

12. The floor panel of claim 10, further comprising:
    a data line coupling the microcontroller to the panel connector configured to transfer controller data between the microcontroller and the panel connector.

13. An airborne vehicle comprising:
    a floor heating system, the floor heating system comprising a floor panel, the floor panel comprising:
        a controller housing having a first side-wall, a second side-wall, a top wall and a bottom wall;
        a first heated panel configured to heat the floor panel, the first heated panel comprising a top set of panel sheets, a bottom set of panel sheets separated from the top set of panel sheets in at least one region, and a heater element interposed between the top and bottom sets of panel sheets in the at least one region, the bottom set of panel sheets resting on the top wall of the controller housing;

a panel connector arranged in the first side-wall of the controller housing;

a heater connector for connecting the controller housing and the first heated panel and arranged in the top wall;

at least one power line coupled between the panel connector and the heater connector in the controller housing and configured to supply electric power, which is input to the panel connector, to the first heated panel via the heater connector;

a switch connected in one of the at least one power lines; and a microcontroller arranged in the controller housing and connected to the switch and configured to actuate the switch for interrupting electric power supply to the first heated panel in case of an electric fault in the floor panel, a communication device coupled to the microcontroller and configured to provide wireless communication to and from the microcontroller wherein the controller housing is connected to the first heated panel by the heater connector, the heater connector being electrically engaged when the controller housing is mechanically mounted to the first heated panel, wherein a first end of the heater connector projects from the top wall into the first heated panel and a second end of the heater connector projects from the top wall into the controller housing, wherein the floor panel is operatively connected to a cabin information data system of the airborne vehicle via a communication data bus, wherein the heater connector is configured as a plug-in unit, and wherein the heater connector electrically connects the first heated panel to the at least one power line.

* * * * *